United States Patent Office 3,136,817
Patented June 9, 1964

3,136,817
UNSYMMETRICAL SCHIFF BASES AND METHOD OF PREPARATION
Harold H. Freedman, Brookline, Mass., assignor to The Dow Chemical Company, Midland, Mich., a corporation of Delaware
No Drawing. Filed Sept. 26, 1960, Ser. No. 58,185
8 Claims. (Cl. 260—566)

This invention is concerned with unsymmetrical Schiff bases and particularly with the preparation of compounds having the structure

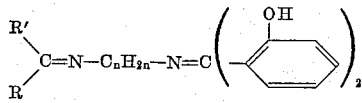

In this and succeeding formulas, R and R' are independently selected from the group consisting of aryl and hydrogen and $n$ is an integer of from 2 to 3, inclusive, wherein said aryl radical is a mononuclear aryl radical containing no more than 8 carbon atoms.

The present invention is also concerned with new compounds particularly those unsymmetrical Schiff bases which may further be defined by the formula

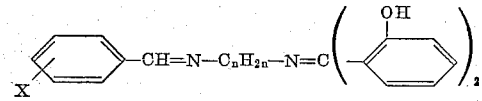

In this and succeeding formulas, X is selected from the group consisting of hydrogen, hydroxy, methoxy and dimethylamino, and $n$ is an integer of from 2 to 3, inclusive. These new compounds are yellow colored solids soluble in many organic solvents such as dimethylformamide, dimethyl sulfoxide, acetone, xylene, ethanol and isopropyl alcohol and substantially insoluble in water.

The unsymmetrical Schiff bases are useful as chelating agents for iron and other metallic ions and may be employed for the removal of undesirable metal ions in industrial and medical uses. It may also be combined with metal ions and as such be a source of the metal in agricultural and industrial operations. The products are useful as toxic ingredients in parasiticidal compositions and in herbicidal compositions.

In accordance with the present invention, unsymmetrical Schiff bases having the above-identified formulas may be prepared by the reaction of 2,2'-dihydroxybenzophenone having the formula

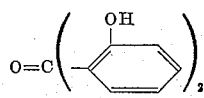

with an alkylenediamine having the formula $$H_2NC_nH_{2n}NH_2$$

to produce an intermediate mono Schiff base having the formula

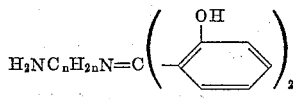

followed by the reaction of the latter with a carbonyl compound having the formula

wherein in this and succeeding formulas, said carbonyl compound embraces those of the formula

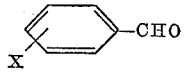

Alternatively, the unsymmetrical Schiff bases may be prepared by reacting together substantially equimolar proportions of 2,2'-dihydroxybenzophenone

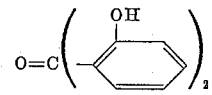

alkylenediamine $$H_2NC_nH_{2n}NH_2$$

and a carbonyl compound

In carrying out the reaction according to the first procedure, approximately 1 molar proportion of the alkylenediamine is mixed together with from ½ to ⅔ molar proportions of 2,2'-dihydroxybenzophenone. The mixture is allowed to react at a temperature of from about 15° to about 100° C. for a period of from about 15 minutes to 24 hours. The reaction is usually carried out in a solvent such as methanol, ethanol or isopropyl alcohol. Conveniently, the reactants are mixed together at room temperature and the reaction mixture allowed to stand overnight at a temperature of from about 15° to 20° C. whereupon the intermediate mono-Schiff base precipitates in the mixture as a crystalline solid. The intermediate may be recovered by filtration and purified, if desired, by conventional proocedures.

In carrying out the second step of the reaction, approximately equimolar proportions of the intermediate mono-Schiff base prepared as above described and the appropriate carbonyl compound are mixed together at a temperature of from about 15° to about 100° C. The reaction is carried out over a period of from about 15 minutes to about 24 hours in the presence of a suitable solvent such as ethyl, methyl and isopropyl alcohol. Conveniently, the reactants are mixed together at room temperature and warmed to the boiling point of the alcohol and thereafter allowed to stand overnight at room temperature. As a result of these operations, the reaction takes place with the formation of the desired unsymmetrical Schiff base product. The latter usually precipitates in the reaction mixture as a yellow crystalline solid and may be recovered and purified according to conventional procedures.

In an alternative method for carrying out the reaction, substantially equimolar proportions of 2,2'-dihydroxybenzophenone, alkylenediamine and an appropriate carbonyl compound are mixed together at a temperature of from about 15° to 50° C. It is important in the preparation to avoid excess quantities of any one of the reactants as the presence of a substantial excess of any reagent leads to the formation of by-products, particularly symmetrical Schiff bases. In carrying out the reaction, an alcoholic solvent is preferably employed. The reaction time varies from about 15 minutes to 24 hours. The reaction is conveniently carried out by mixing all reactants at room temperature and allowing the mixture to stand overnight at room temperature. The product usually remains in solution and may be recovered from the reaction mixture by cooling, scratching or other conventional methods.

The following examples illustrate the invention but are not to be construed as limiting.

EXAMPLE 1

*2,2'-((2-(o-Hydroxybenzylideneamino)ethylimino)- methylene)diphenol*

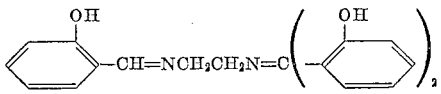

42.8 grams (0.2 mole) of 2,2'-dihydroxybenzophenone was added to a solution of 18 grams (0.3 mole) of anhydrous ethylenediamine in 150 milliliters of ethyl alcohol. The resulting mixture was a clear yellow solution and was allowed to stand overnight in the refrigerator. At the end of this period, it was found that a 2,2'-((2-aminoethylimino)methylene)diphenol intermediate had precipitated as a yellow crystalline solid. The intermediate product melted at 185° C., solidified and then remelted with decomposition at approximately 250° C. After recrystallization from ethyl alcohol, the intermediate product was supported by elemental analyses calculated as $C_{15}H_{16}N_2O_2$ and by infrared spectrum.

1 gram (0.0039 mole) of the mono-Schiff base prepared as above described and 1 gram (0.0094 mole) of salicylaldhyde were mixed together in 30 milliliters of ethyl alcohol, warmed for a short period of time and then allowed to stand overnight at room temperature. As a result of these operations, the desired 2,2'-((2-(o - hydroxybenzylideneamine)ethylimino)methylene)diphenol product precipitated in the reaction mixture as a yellow solid. The latter was recovered by filtration and recrystallized from ethanol to obtain a purified product as fine yellow needles melting at 241°–242° C. The structure of the product was supported by infrared analyses. The product had elemental analyses (calculated for $C_{22}H_{20}N_2O_3$) as follows:

|  | Carbon | Hydrogen | Nitrogen |
| --- | --- | --- | --- |
| Theoretical | 73.3 | 5.6 | 7.8 |
| Found | 73.0 | 5.7 | 7.7 |

EXAMPLE 2

*2,2'-((2-(p-Methoxybenzylideneamino)ethylimino)- methylene)diphenol*

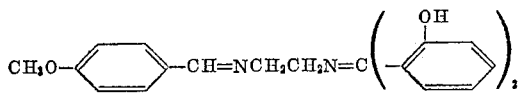

2,2'-((2 - aminoethylamino)methylene)diphenol intermediate was prepared as described in Example 1. 1 gram (0.0039 mole) of the mono-Schiff base thus prepared and 0.53 gram (0.0039 mole) of p-methoxybenzaldehyde were dissolved in 75 milliliters of methyl alcohol, the mixture warmed for a short period and then allowed to stand overnight at room temperature to obtain the desired 2,2'-((2 - (p - methoxybenzylideneamino)ethylimino)methylene)diphenol product. The latter was a yellow crystalline solid which was recovered by filteration and recrystallized from ethyl alcohol to obtain a purified product melting at 216°–217° C.

EXAMPLE 3

In operations carried out as above described, the following compounds are prepared:

2,2' - ((2 - (o - methoxybenzylideneamino) - 1 - methylethylimino)methylene)diphenol by the reaction of 2,2'-dihydroxybenzophenone with propylenediamine to produce the intermediate 2,2'-((2-amino-1-methylimino)- methylene)diphenol followed by the reaction of the latter with o-methoxybenzaldehyde.

2,2' - ((2 - (p - dimethylaminobenzylideneamino) - 1 - methylethylimino)methylene)diphenol by the reaction of 2,2'-dihydroxybenzophenone and propylenediamine to produce the intermediate 2,2'-((2-amino-1-methylethylimino)methylene)diphenol followed by the reaction of the latter with p-dimethylaminobenzaldehyde.

2,2' - ((2 - (m - hydroxybenzylideneamino)ethylimino)- methylene)diphenol by the reaction of 2,2'-dihydroxybenzophenone and ethylenediamine to obtain the 2,2'-((2-aminoethylimino)methylene)diphenol intermediate followed by the reaction of the latter with m-hydroxybenzaldehyde.

2,2' - ((2 - benzylideneaminoethylimino)methylene)- diphenol by the reaction of 2,2'-dihydroxybenzophenone and ethylenediamine to produce the intermediate 2,2'-((2-aminoethylimino)methylene)diphenol intermediate followed by the reaction of the latter with benzaldehyde.

2,2' - ((3 - (p - dimethylaminobenzylideneamino)propylimino)methylene)diphenol by the reaction of 2,2'-dihydroxybenzophenone and trimethylenediamine to produce the intermediate 2,2'-((3-aminopropylimino)methylene)diphenol followed by the reaction of the latter with p-dimethylaminobenzaldehyde.

2,2' - ((3 - (o - dimethylaminobenzylideneamino)propylimino)methylene)diphenol by the reaction of 2,2'-dihydroxybenzophenone and trimethylenediamine to produce the intermediate 2,2'-((3-aminopropylimino)methylene)diphenol followed by the reaction of the latter with o-dimethylaminobenzaldehyde.

EXAMPLE 4

*2,2'((2-(o-Hydroxybenzylideneamino)ethylimino)- methylene)diphenol*

3.05 grams (0.05 mole) of ethylenediamine was added to a solution of 10.7 grams (0.05 mole) of 2,2'-dihydroxybenzophenone and 6.1 grams (0.05 mole) of salicylaldehyde in 50 milliliters of ethyl alcohol. The reaction mixture was allowed to stand overnight at room temperature to obtain the desired 2,2'-((2-(o-hydroxybenzylideneamino)ethylimino)methylene)diphenol product which remained in solution in the reaction mixture. The reaction vessel was scratched to precipitate the desired product as a yellow crystalline solid. The product thus obtained melted at 241°–242° C. The yield of the product was 13 grams or 80 percent of theoretical.

EXAMPLE 5

*2,2'-((2-Benzylideneaminoethylimino)methylene)- diphenol*

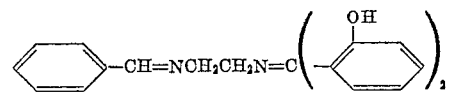

3.05 grams (0.05 mole) of ethylenediamine was added to a solution of 10.7 grams (0.05 mole) of 2,2'-dihydroxybenzophenone and 10.6 grams (0.05 mole) of benzaldehyde in 50 milliliters of ethyl alcohol. The reaction mixture was allowed to stand overnight at room temperature to obtain the desired 2,2'-((2-benzylideneaminoethylimino)methylene)diphenol product. The latter was recovered by precipitating from the reaction mixture by scratching and filtering. The product melted at 183°–184° C.

EXAMPLE 6

*2,2'-((2-(p-Dimethylaminobenzylideneamino)ethylimino)methylene)diphenol*

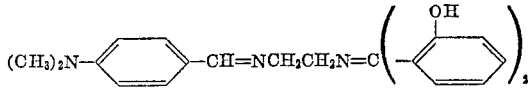

In a similar manner, 3.05 grams (0.05 mole) of ethylenediamine was added to a solution of 10.7 grams (0.05 mole) of 2,2'-dihydroxybenzophenone and 7.45 grams (0.05 mole) of p-dimethylaminobenzaldehyde in 50 milliliters of ethyl alcohol to obtain a quantitative yield of the desired 2,2'-((2-(p-dimethylaminobenzylideneamino)ethylimino)methylene)diphenol product. The product was a yellow crystalline solid melting from 247° to 249° C.

EXAMPLE 7

In preparations carried out in a manner similar to that described in Example 4, the following compounds are prepared:

2,2' - ((2 - (p-methoxybenzylideneamino)ethylimino)-methylene)diphenol having a melting point of 216°–217° C. by the reaction of 2,2'-dihydroxybenzophenone and ethylenediamine to obtain an intermediate 2,2'-((2-aminoethylimino)methylene)diphenol followed by the reaction of the latter with p-methoxybenzaldehyde.

2,2' - ((2 - (o-methoxybenzylideneamino)ethylimino)-methylene)diphenol having a melting point of 218°–219° C. by the reaction of 2,2'-dihydroxybenzophenone and ethylenediamine to produce the intermediate 2,2'-((2-aminoethylimino)methylene)diphenol followed by the reaction of the latter with o-methoxybenzaldehyde.

2,2' - ((3-(p-methoxybenzylideneamino)propylimino)-methylene)diphenol by the reaction of 2,2'-dihydroxybenzophenone and trimethylene diamine to obtain the intermediate 2,2' - ((3 - aminopropylimino)methylene)diphenol followed by the reaction of the latter with p-methoxybenzaldehyde.

2,2' - ((3-(m-hydroxybenzylideneamino)propylimino)-methylene)diphenol by the reaction of 2,2'-dihydroxybenzophenone and trimethylenediamine to produce an intermediate 2,2' - ((3 - aminopropylimino)methylene)diphenol followed by the reaction of the latter with 3-hydroxybenzaldehyde.

2,2 - ((2 - (m - dimethylaminobenzylideneamino)-1-methylethylimino)methylene)diphenol by the reaction of 2,2'-dihydroxybenzophenone and propylene diamine to produce the intermediate 2,2'-((2-amino-1-methylethylimino)methylene)diphenol followed by the reaction of the latter with m-dimethylaminobenzaldehyde.

The products obtained by the method of the present invention are useful as chelating agents for numerous metallic ion species. As chelating agents, they may be employed to remove undesirable metallic ions from biological and industrial operations where the presence of metallic ions is undesirable. Furthermore, as chelating agents, these compounds may be reacted with metallic ions to form metal chelates and be employed as such for supplying metallic ions where controlled releases are desired.

The products obtained by the method of the present invention also are useful as parasiticides particularly in miticidal and antimicrobial compositions. In a representative operation of such use, substantially complete controls of two spotted spider mite was obtained when infested plants were sprayed with an aqueous dispersion containing 0.05 gram of 2,2'-((2-(o-hydroxybenzylideneamino)ethylimino)methylene)diphenol per 100 milliliters of aqueous dispersion.

The products of the present invention which are defined by the formula

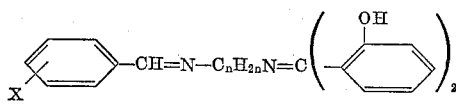

wherein X is hydrogen, hydroxy, methoxy or dimethylamino and $n$ is 2 or 3, are useful as aquatic herbicides for the control of submersed and floating aquatic weeds such as Cabomba, Salvinia, moneywort, anacharis and Coontail species. In representative operations for such use, 2,2' - ((2-o-hydroxybenzylideneamino)ethylimino) methylene)diphenol, 2,2' - ((2-(p-methoxybenzylideneamino)ethylimino)methylene)diphenol, 2,2'-((2-benzylideneaminoethylimino)methylene)diphenol, 2,2'-((2-(o-methoxybenzylideneamino) ethylimino) methylene) diphenol and 2,2'-((2-(p-dimethylaminobenzylideneamino) ethylimino)methylene)diphenol were separately dispersed in tanks, each tank containing one of the above weeds, in an amount sufficient to provide a concentration therein of 50 parts by weight of one of the diphenols per million parts of aqueous medium. Examination of the tanks after 430 hours showed substantially complete control of all water weed species.

We claim:

1. A compound having the formula

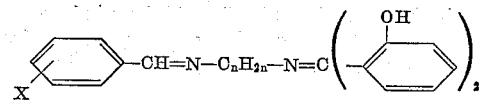

wherein X is selected from the group consisting of hydrogen, hydroxy, methoxy and dimethylamino and $n$ is an integer of from 2 to 3, inclusive.

2. 2,2'-((2-(o - hydroxybenzylideneamino)ethylimino)methylene)diphenol.

3. 2,2' - ((2 - (benzylideneamino)ethylimino)methylene)diphenol.

4. 2,2' - ((2 - (o - methoxybenzylideneamino)ethylimino)methylene)diphenol.

5. 2,2' - ((2 - (p-dimethylaminobenzylideneamino)ethylimino)methylene)diphenol.

6. 2,2' - ((2 - (p - methoxybenzylideneamino)ethylimino)methylene)diphenol.

7. A process for preparing unsymmetrical Schiff bases having the formula

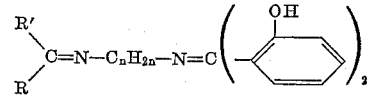

which comprises mixing together at room temperature from about ½ to ⅔ molar proportion of 2,2'-dihydroxybenzophenone having the formula

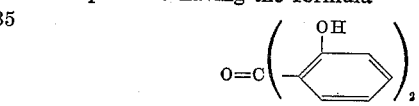

with one molar proportion of an alkylenediamine having the formula

to produce an intermediate mono-Schiff base having the formula

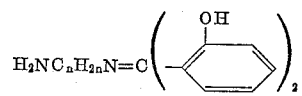

followed by the reaction of the latter at temperatures of from about 15° C. to 100° C. with an approximately equimolar proportion based on said Schiff base of a carbonyl compound having the formula

wherein in the above formulas R and R' are independently selected from the group consisting of aryl and hydrogen and $n$ is an integer of from 2 to 3, inclusive, wherein said aryl radical is a mononuclear aryl radical containing no more than 8 carbon atoms.

8. A process for preparing unsymmetrical Schiff bases having the formula

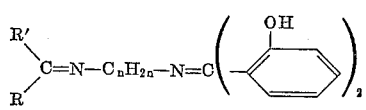

which comprises mixing together at a temperature of from about 15° to 50° C. substantially equimolar proportions of 2,2'-dihydroxybenzophenone, and alkylenediamine having the formula

and a carbonyl compound having the formula

wherein in the above formulas R and R' are independently selected from the group consisting of aryl and hydrogen and $n$ is an integer of from 2 to 3, inclusive, wherein said aryl radical is a mononuclear aryl radical containing no more than 8 carbon atoms.

References Cited in the file of this patent

UNITED STATES PATENTS

| | | |
|---|---|---|
| 2,181,121 | Downing et al. | Nov. 28, 1939 |
| 2,813,080 | Bartlett | Nov. 12, 1957 |
| 2,868,833 | Szabo et al. | Jan. 13, 1959 |
| 2,872,490 | Clough | Feb. 3, 1959 |